3,425,084
BRUSHES AND METHOD FOR THEIR MANUFACTURE
William A. St. Laurence, Hatfield, and Lewis James Halberstadt, Williamsburg, Mass., assignors to Pro-Phy-Lac-Tic Brush Company, Florence, Mass., a corporation of Ohio
Filed Aug. 8, 1966, Ser. No. 570,697
U.S. Cl. 15—195    4 Claims
Int. Cl. A46b 3/16; A46d 1/08

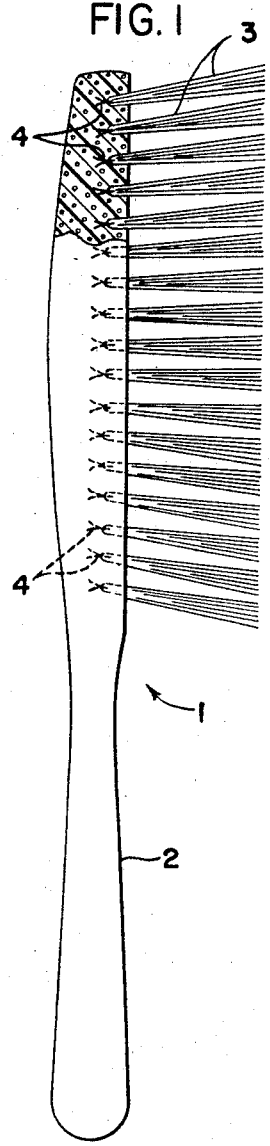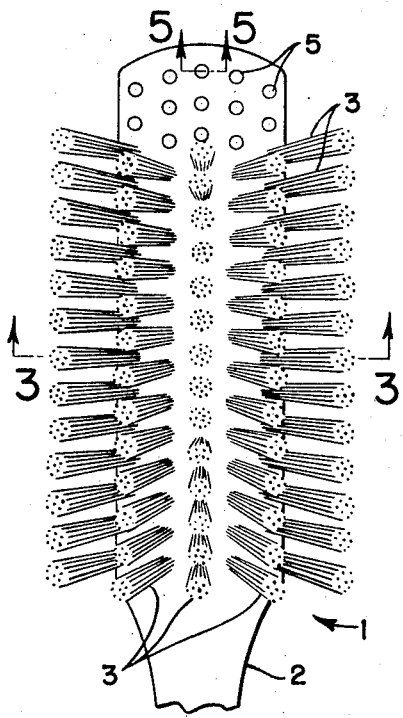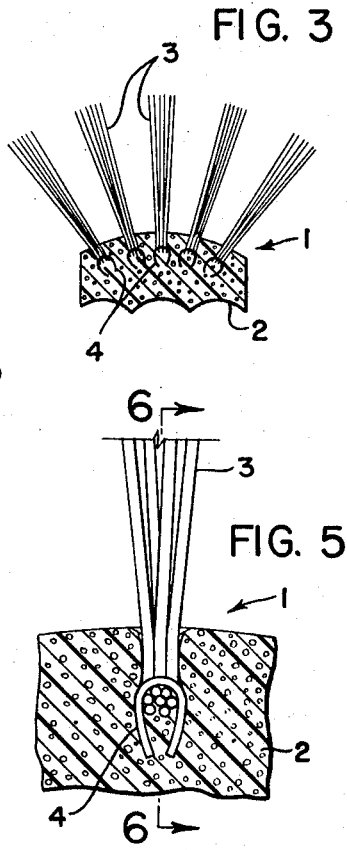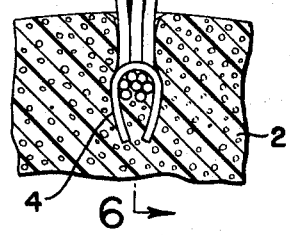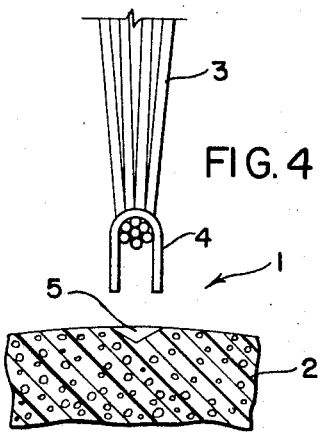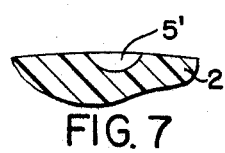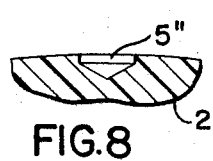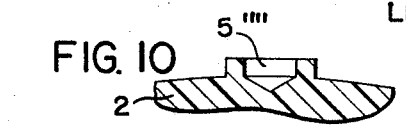
Feb. 4, 1969 — W. A. ST. LAURENCE ET AL — 3,425,084
BRUSHES AND METHOD FOR THEIR MANUFACTURE
Filed Aug. 8, 1966
INVENTORS.
WILLIAM A. ST. LAURENCE &
LEWIS JAMES HALBERSTADT
BY
*Leland L. Chapman*
ATTORNEY United States Patent Office 3,425,084
Patented Feb. 4, 1969

ABSTRACT OF THE DISCLOSURE

Brushes, such as household brushes, personal brushes, industrial brushes and the like, are prepared from foamed thermoplastic backs by direct stapling of bristles therein. A novel method of manufacturing brushes which eliminates the necessity for drilling or otherwise providing holes in the plastic brush back prior to insertion of the tufts therein is provided.

---

This invention relates to novel brushes and their manufacture and more particularly pertains to novel brushes such as household brushes, large industrial brushes and brooms and the like composed of a foamed plastic back with bristles stapled therein and to the method for their production.

Brushes of many types and description having thermoplastic bodies or heads are well-known, and in the past have been manufactured from a thermoplastic shape or blank which has been extruded or molded at a suitable temperature and pressure. After the resulting shape has cooled to a temperature below the softening point of the thermoplastic material, it is subsequently drilled or otherwise provided with suitable cavities for receiving tufts of bristles. In order to anchor or lock a tuft of bristles in each of the cavities, a metallic insert or pin may be forced into the cavity simultaneously with the tuft. This metallic insert or pin may assume various shapes, and it generally extends through the tuft of bristles and positively engages the wall of the cavity at two or more points. Preferably, the metallic insert is forced into the cavity to a point below the surface of the article and approximately midway of the depth of such cavity. In U.S. Patent No. 2,397,471, the production of plastic body brushes is described as well as means for eliminating localized strains which are generated in the walls of the cavities of the brush after insertion of the metal insert and bristles by induction heating. These strains, which ultimately cause cracks and failure of the brush, are particularly concentrated in the plastic bodies at the points where the metal insert pierces the plastic.

Problems of anchoring bristles or tufts in molded plastic brush backs, wherein the brush back is first provided with holes or bores to receive the bristles, are claimed to have been solved as in U.S. Patents Nos. 2,409,490 and 3,026,146. The procedure of U.S. Patent No. 2,409,490 involves the use of a plastic anchor in place of a metal insert for holding the bristles in the bore. It is said that the plastic anchor softens upon impact of the insert and upon cooling forms a mechanical interlock or bond with the brush back to securely hold the tufts in position. The process of U.S. Patent No. 3,026,146 is a casting technique for small brushes whereby a liquid plastic material is poured into drilled or otherwise provided hollow compartments in the plastic brush backs, the ends of the bristles are immersed in the liquid plastic material and the liquid plastic material is solidified by some means.

More details concerning the manufacture of brushes employing earlier techniques are set forth in U.S. Patents Nos. 2,084,345, 2,433,192 and 2,710,774.

The usual process of drilling or otherwise providing holes in plastic brush backs, such as by molding, becomes quite complicated and expensive when the holes are not parallel and of the same depth, etc. The necessary tooling and molds for drilling or molding irregularly positioned or angled holes in plastic brush backs is expensive to make and operate and thus adds to the basic cost of the brush.

It is a primary object of this invention to provide a novel method of manufacturing brushes which eliminates the necessity for drilling or otherwise providing holes in the plastic brush back prior to insertion of the tufts therein.

It is another object to provide a process for preparing strain free plastic backed brushes which does not involve a heating step to relieve strains.

It is also another object of this invention to provide a method for the manufacture of brushes in mass production quantities at small cost.

For further comprehension of the invention and of the objects and advantages thereof, reference will be had to the following description and to the appended claims in which the various novel features of the invention are more particularly set forth.

In the accompanying drawing:
FIGURE 1 is a side elevation, partly in section, of a brush prepared according to the process of this invention.
FIGURE 2 is a top view of the brush.
FIGURE 3 is a sectional view taken along line 3—3 in FIGURE 2.
FIGURE 4 is a side sectional view of a single tuft of bristles with a staple extended across the folds of the bristles just above a section of the brush into which the tuft is to be punched.
FIGURE 5 is a sectional view taken along line 5—5 in FIGURE 2.
FIGURE 6 is a sectional view of the brush with single tufts of bristles and staple therein.
FIGURES 7, 8, 9 and 10 are different types of molded brush surface configurations through which the tufts may be punched.

The brush 1 has a body which is composed of a continuous outer surface and a substantially closed cell interior 2 containing a plurality of tufts of bristles 3 which are anchored in the brush body by means of a staple 4 which is extended across the folds of each of the bristle tufts prior to punching the staple and tufts into the brush body. The brush body may also be molded with slight indentations 5, 5' or by slightly protuberances 5", 5'", 5"" which may be formed by molding on the top surface thereof.

According to the present invention, strain-free plastic backed brushes are produced from a foamed plastic back or body and tufts of bristles by stapling the bristles or tufts directly into the brush back without the necessity for the conventional pre-drilling of holes in the brush back and without the necessity for any subsequent heating to relieve strain or any other subsequent step. In the instant process tufts of bristles are inserted directly into a brush back which is formed by extrusion, molding, or other thermoforming operation of a substantially closed-cell thermoplastic material, said brush back having a smooth, continuous, outer surface thereon. The insertion of the tufts of bristles into this brush back is accomplished by extending a staple across the folds of each of the bristle tufts and punching said staples and said bristle folds through and below the outer surface of said brush back. It is indeed unobvious that the instant process can be employed to eliminate all of the earlier encountered problems of hole drilling, stress cracking, etc., and provide an excellent brush product comparable in all known respects to previously available brushes.

It has been found that when a brush is prepared from a brush back composed of a foamed plastic, such as foamed polyethylene, in the conventional manner for the manufacture of brushes involving drilling holes in the back followed by insertion of the bristles and metal inserts, an inferior brush results. The tufts in brushes constructed in this manner generally have a pull test of less than five pounds pull by the usual brush testing method; the bristles are easily removed from such a brush by pulling on them vertically in the direction of the bristles away from the brush back with a force less than five pounds or in many cases the bristles will become loosened and fall out prematurely in the course of normal use of the brush. Acceptable brushes, including those of the present invention are those which have tufts that will undergo from five to ten pounds vertical pull.

The instant process of directly inserting bristles and metal insert into a solid brush back constructed from a foamed plastic material is most convenient in terms of time and equipment required in comparison with prior art processes and produces an excellent light-weight brush.

It is preferred in our process that metal inserts be used in anchoring the tufts in the brush back. The "legs" of the metal insert, which normally are in the U shape of a staple, may be bent during or near the end of the insertion so that it serves as a better anchor for the tuft in the foamed plastic brush back as described in U.S. Patents Nos. 47,157; 62,460, and 65,029. It is also contemplated to be within the scope of the present invention to use brush backs which have molded-in slight depressions, lips, etc., at the points where the tufts are to be inserted into the foamed plastic.

In the present invention, the foamed plastic brush backs include substantially closed cell structures with substantially cell free continuous surfaces made from thermoplastic materials such as polyolefins including polyethylene, polypropylene, ethylene-propylene copolymers and others, foamed polystyrene, foamed vinyls such as polyvinyl chloride, foamed vinyl chloride copolymers and plasticized polymers of this type, foamed acrylonitrile-butadiene-styrene type resins, foamed acrylic resins such as polymethylmethacrylate, foamed polyamides such as nylon, foamed polyurethanes of many types and other like materials well known to those skilled in the art. Foamed polyolefins, which may be linear or branched, high or low density, and particularly foamed polyethylene is useful as a brush back material in the present invention. The closed cell plastic structures or foamed plastic brush backs can be further defined as those containing closed cell voids in their mass and having a density appreciably less than the density of the same material in its compacted mass. The foamed polyethylene useful in the present invention, for instance, should have a density between about 0.2 and 0.9 gram per cubic centimeter.

Bristles useful in the brushes of this invention can be made of natural fibrous materials such as animal hair, synthetics such as nylon, polystyrene, polypropylene, polyethylene and the like, or blends of any of the foregoing.

The foamed plastic material useful as brush backs in the present invention can be prepared by any of a number of known methods. One such method is that disclosed in British Patent No. 1,018,178. This patent discloses a process for the continuous production of moldings and extrusions from thermoplastic synthetic materials in which a cellular structure is produced by the incorporation of an expanding medium and is characterized in that the plasticizing of the synthetic material is performed or completed in a worm machine which also places the said material under compression, the expanding medium being fed into the said machine at a point where the synthetic material is under mechanical pressure and being itself subjected to gas pressure, the expanding medium being mixed with the synthetic material in the worm machine during its passage from the point of entry of the expanding medium to an extrusion nozzle and the temperature and pressure of the mass during such passage being maintained at values such that the expanding medium produces substantially no cell formation, the mass, after emerging from the extrusion nozzle, being subjected to cooling at its outer surface sufficient to at once form a closed but extensible outer skin without setting the interior of the mass, the expanding medium due to the reduction of pressure, expanding the mass to produce a cellular structure within the said outer skin before setting of the mass takes place. Most preferred in the present invention are brush bodies composed of foamed polyolefin having a substantially closed cell structure and polyethylene in the preferred polyolefin.

Brushes were prepared using a foamed polyethylene backing: (A) a brush in which the bristles were stapled with a metal staple directly into the foamed polyethylene back, and (B) a brush in which the same type of bristles used in (A) were stapled with the same kind of staple used in (A) into a foamed polyethylene back of the same kind used in (A) with the exception that holes for receiving tops of bristles and staple were drilled in the conventional manner prior to the stapling operation. A standard pull test was carried out on the bristles of brushes (A) and (B) with the following results:

| Brush | Greatest pull in pounds | Lowest pull in pounds | Average pull |
|---|---|---|---|
| (A) | 19.5 | 12.5 | 16.35 |
| (B) | ¹ 2.5 | ¹ 0 | ¹ 0.35 |

¹ The average figures for (B) are not too reliable because many of the knots came out with such ease that they did not register on the pull machine.

While the preferred embodiment of this invention has been illustrated and described, it is to be understood that various changes and modifications may be made within the scope of the invention, as defined in the appended claims.

We claim:

1. A method of manufacturing a brush comprising a brush back and a plurality of tufts of folded bristles stapled directly into said brush back comprising the steps of forming said back out of a substantially closed-cell thermoplastic material having a smooth, continuous, outer surface thereon, extending a staple across the folds of each of the bristle tufts, and then punching said staples and said bristle folds through and below the outer surface of said brush back.

2. The method of claim 1 wherein the thermoplastic material is a polyolefin.

3. The method of claim 2 wherein the polyolefin is polyethylene.

4. The brush produced by the method of claim 1.

References Cited

UNITED STATES PATENTS

| | | | |
|---|---|---|---|
| 3,106,426 | 10/1963 | Stingley | 300—21 |
| 3,129,269 | 4/1964 | Charvat | 300—21 X |
| 3,129,448 | 4/1964 | Mittman | 57—187 X |
| 3,160,163 | 12/1964 | Bolinger | 15—114 X |
| 3,256,546 | 6/1966 | Schmidt | 300—21 X |

PETER FELDMAN, *Primary Examiner.*

U.S. Cl. X.R.

300—8, 21